United States Patent [19]

Rodier

[11] 4,129,640

[45] Dec. 12, 1978

[54] PROCESS FOR PRODUCING SHAPED ARTICLES OF CELLULOSE

[75] Inventor: Henry Rodier, Sainte-Foy-les-Lyon, France

[73] Assignee: Rhone Poulenc Textile, Paris, France

[21] Appl. No.: 815,856

[22] Filed: Jul. 14, 1977

[30] Foreign Application Priority Data

Jul. 16, 1976 [FR] France .................................. 76 22031

[51] Int. Cl.$^2$ .............................................. C08L 1/24
[52] U.S. Cl. .................................. 264/187; 106/163 R; 106/168; 264/188
[58] Field of Search ...................... 264/187, 188, 189; 106/168, 163 R; 8/116.4

[56] References Cited

U.S. PATENT DOCUMENTS

| | | | |
|---|---|---|---|
| 3,236,669 | 2/1966 | Williams | 106/163 |
| 3,706,526 | 12/1972 | Swidler et al. | 8/116.4 |
| 4,022,631 | 5/1977 | Turbak et al. | 106/168 |
| 4,028,132 | 6/1977 | Litt et al. | 106/163 R |
| 4,044,090 | 8/1977 | Portnoy | 106/163 R |

*Primary Examiner*—Jay H. Woo
*Attorney, Agent, or Firm*—Murray & Whisenhunt

[57] ABSTRACT

A process for producing shaped articles of cellulose is disclosed, wherein the process includes steps of contacting a shaped solution of cellulose in DMSO and formaldehyde, containing at least 6% by weight of cellulose based on the volume of DMSO, and containing formaldehyde in a weight ratio of formaldehyde/cellulose of about 0.2 to about 0.6, with a coagulating solution of DMSO and water at a temperature no greater than 10° C. The coagulant bath generally contains 30 to 50% by weight of DMSO, and the solutions are readily coagulated at coagulation speeds appropriate for commercial practice, and generally the coagulation occurs in less than 20 seconds.

The products produced by the present process are shaped articles such as filaments, fibers, films, sheets and membranes, and especially filaments which are suitable for use in the textile field.

10 Claims, No Drawings

PROCESS FOR PRODUCING SHAPED ARTICLES OF CELLULOSE

BACKGROUND OF THE INVENTION

The present invention relates to a process for shaping cellulose solutions by a physical method, and the shaped articles, especially spun articles, thus obtained.

Previously used cellulose solvents were generally sulphuric acid and phosphoric acid, which tend to degrate the cellulose by causing severe hydrolysis, or complexes of heavy metals and amine compounds used in the cuprammonium process, which complexes are rather uneconomical to use because the solvent cannot be recovered directly but only in an indirect and complicated manner.

The prior art has also known other solvent complexes or solvent mixtures for cellulose. Thus, the prior art has used ferric/tartrate complexes or mixtures of dimethylsulphoxide with dimethylacetamide or nitrogen dioxide, or sulphur dioxide and an amine. Because of major technical and/or economic problems, however, such complexes or mixtures have not lead to industrial spinning processes.

The most widely used spinning process includes an initial chemical conversion of the cellulose in order to produce a soluble intermediate product, cellulose xanthate, followed by a fresh chemical conversion to regenerate the cellulose. In such a process, significant comsumption of chemical reactants, and especially a major loss of carbon disulphide, is involved.

Johnson et al., IPC Technical Paper Series of The Institute of Paper Chemistry, No. 5 (April 1975), report that they are able to dissolve cellulose, at very low concentrations, mainly 1 to 3% by weight/volume, in dimethylsulphoxide (DMSO) containing a large amount of formaldehyde relative to the amount of cellulose (on the order of 5 to 20 times the weight of the cellulose). Solutions of such low concentration are completely unsuitable for shaping on an industrial scale to produce filaments, fibers, membranes, films, sponges and the like, and the yield of the process of dissolving the cellulose is extremely low, because in most cases a large undissolved residue remains, which can represent up to 37% of the weight of the pulp, which is only employed at the rate of 1% relative to the DMSO. In addition, the high paraformaldehyde content interfers with the subsequent shaping operation. The described cellulosic solutions are extruded through a syringe into a tray of methanol, to produce a fibrous product. Such a process is clearly unsuitable for industrial application, as it does not involve a rapid coagulation, compatible with a continuous spinning process, and does not produce a gel capable of withstanding the spinning tensions, and hence does not lead to fibers of suitable properties. These authors teach that solutions of higher cellulose concentration can only be obtained from cellulose having a low degree of polymerization. As is known in the art, these celluloses of low degrees of polymerization are not found in the natural state, and can only be obtained by a prior chemical treatment of native cellulose, with consequential considerable increase in cost. Futhermore, filaments produced from celluloses having low degrees of polymerization have generally poor properties and are sometimes unsuited for textile applications.

French patent application No. 2,311,783, published on Dec. 17, 1976, claiming U.S. priority of an application filed on May 19, 1975, discloses a process for spinning solutions of cellulose in DMSO and formaldehyde. The French patent application describes solutions containing at least 0.8 parts by weight of aldehyde per part of cellulose, and 2 to 14% by weight of cellulose per volume of DMSO, which can be spun into an aqueous solution of a pH $>7$ containing compounds such as ammonia liquor or ammonium salts. The filaments produced have such poor properties, and especially a very low elongation, as to render them unsuitable for textile applications.

SUMMARY OF THE INVENTION

The present invention relates to a process for producing shaped cellulosic articles. The process involves providing a shaped solution of cellulose in DMSO and formaldehyde, with the solution containing at least 6% by weight of cellulose based on the volume of DMSO, and containing formaldehyde in a weight ratio of formaldehyde/cellulose of 0.2 to 0.6. This shaped solution is contacted with a coagulating solution of DMSO and water at a temperature of no greater than 10° C.

The present process is a continuous process suitable for the industrial manufacture of cellulose fibers by a physical method, and the resulting fibers have good textile properties. In addition to fibers and filaments, the process is also applicable to the production of other shaped articles, such as films.

DETAILED DESCRIPTION OF THE INVENTION

The cellulose which is used in the process of the present invention is normally cellulose I, or "native cellulose," which can be of any origin, such as, for instance, cotton linters, wood pulp, pulp originating from other sources, or even scrap material.

It is known that celluloses having a DP of less than 400 generally have inadequate physical properties to be successfully used in textile applications, and thus in almost all instances the cellulose used in the solutions of the present invention will have a DP of at least 400. It is preferred that the cellulose have a DP of between 400 and 1,100, although celluloses with the higher degree of polymerization can also be used if desired.

For greater convenience, the term "spinning" will, in the present text, be used for the shaping of filaments, fibers, membranes, or films, and the term "fibers" and the term "filaments" will be used to also comprise other shaped articles such as membranes, films, or sheets.

It is known to the art that the possibility of causing the cellulose molecules to react, or of solvating the cellulose molecules, is to a large part determined by the architecture in which the cellulose molecules are involved in the solid state. The art has characterized the ease of penetration of a reactant into the texture of a cellulose by making general resort to the concept of accessibility. Cellulose accessibility depends in a complex manner on the length of the chains of the cellulose, the mean DP, the size of the crystalline and amorphous zones and the fibrillar structure, which characterize the morphology of the cellulose fibers in question. The cellulose is dissolved by introducing the cellulose into a hot mixture of DMSO and formaldehyde.

The DMSO preferably has a water content less than 1,000 ppm, prior to admixture with the other components of the solution. The DMSO water content will vary according to the accessibility of the cellulose which is to be dissolved therein, with the lower the cellulose accessibility the lower the water content of the DMSO. The DMSO which is used must be substantially anhydrous, or must previously been dried to a water content of generally less than 1,000 ppm of water, depending upon the particular cellulose starting material. Thus, to dissolve a cellulose originating from wood pulp or linters, for instances, and having a DP of 1,000 or more, it is generally preferred to use a DMSO having a water content of less than 500 ppm and preferably of less than 100 ppm.

For greater convenience of operation, it is preferred to use formaldehyde which is in the form of paraformaldehyde. The amount of paraformaldehyde necessary for the dissolving process must be such that the formaldehyde/cellulose weight ratio is at least 1, and preferably between 1 and 2.

The formaldehyde/cellulose weight ratio depends to a large extent upon the accessibility of the cellulose which is to be dissolved to form the solution. Thus, for certain native celluloses exhibiting relatively low accessibilities, a rather high formaldehyde/cellulose weight ratio will be utilized. In general, the formaldehyde/cellulose weight ratio will increase with a decrease of the accessibility of the cellulose which is to be employed.

The formaldehyde which is used preferably contains no more than 4% by weight of water.

It is advantageous to carry out the dissolving process at an elevated temperature, preferably of 90° to 130° C., although lower or higher temperatures could be used if desired. The use of such lower or higher temperatures does not provide any advantages, however. It is also preferred to heat the DMSO before introducing therein the cellulose which is to be dissolved.

The amount of cellulose dissolved is at least 6% by weight/volume of DMSO and can be much greater, for example 20% or more, always depending on the accessibility of the cellulose.

It is critical that the formaldehyde/cellulose weight ratio in the cellulose solution be from 0.2 to 0.6, and preferably between 0.2 and 0.4, at the time the shaped article is coagulated. As indicated above, the formaldehyde/cellulose weight ratio must be at least one during the dissolving step. To achieve the necessary low formaldehyde/cellulose weight ratios for the coagulation step, after the dissolving step is completed, the formaldehyde/cellulose weight ratio is reduced to the desired level by removing the free formaldehyde, or formaldehyde combined with the cellulose. This formaldehyde removal can be by any known means, including driving off the formaldehyde by use of anhydrous, preferably inert, gas, or by distillation under reduced pressure. This step of reducing the formaldehyde content can be conducted without risk of forming gels or coagulation of the solution, provided that the formaldehyde/cellulose weight ratio remains at least as great as 0.2. After the formaldehyde/cellulose weight ratio has been reduced to the desired range, the amount of DMSO in the solution may be brought back to its original value.

If a cellulose having a DP of less than 400 is used, such as cellulose II, possibly derived from waste products, it is possible to dissolve the cellulose with a formaldehyde/cellulose weight ratio of less than 1, and thus it may be possible to entirely dispense with the step of removing the excess formaldehyde. However, such celluloses having a DP of less than 400 are generally not suitable for the production of filaments having good physical properties. For this reason, the cellulose used in the solutions of the present invention will preferably have a DP of at least 400. The coagulant bath, which contains water and DMSO, preferably contains about 30 to 50% by weight of DMSO in the mixture. The temperature of the liquid coagulant bath must be less than 10° C., and must, of course, be above the freezing point of the mixture. A temperature of about +2° C. is particularly advantageous.

In view of the low temperature of the coagulant bath, it is necessary to avoid cooling the solution which is to be spun, in order to avoid blockages of the spinneret head due to solidification of the solution. This may be accomplished by heating the solution which is to be extruded through the spinneret head, by heat insulation of the spinneret head, or by a combination of these two methods.

Normally the cellulose solution will be at a temperature of at least 20° C. in the spinneret assembly before contacting the coagulant bath. After leaving the spinneret head, the cellulose solution is rapidly coagulated, in a time of less than 20 seconds, and preferably at about 5 seconds. Normally, the coagulation time will take at least 1 second or so. The rapid coagulation times which are achieved by the present process permit the process to be used in the commercial production of cellulosic filaments.

The extruded filaments are contacted with the coagulant bath for a time necessary to ensure substantially complete coagulation, which, as mentioned above, occurs in a relatively short period of time. The filaments are then discharged from the coagulant bath, and after leaving the coagulant bath the filaments can be washed with water, if desired, before an optional drawing step. The filaments can be drawn in one or several stages, either in air or in an aqueous bath or successively in each. Normally, the filaments will be drawn by a factor of 10% to 50% in each stage. Any residual solvent in the filaments can be removed by a drying step, which can be conducted during or after the drawing step. For economic reasons, it may be advantageous to conduct the drying and the drawing steps simultaneously, with solvent recovery.

Cellulose solutions in a mixture of DMSO and formaldehyde are quite difficult to coagulate in a non-solvent media in very short periods of time which are compatible with industrial, continuous spinning processes. Normally these times are less than 20 seconds, and preferably are in the order of about 5 seconds, in order to be commercially acceptable. Thus, the process of the present invention is most surprising because the cellulose solutions can be adequately coagulated within these time periods.

The present process is all the more surprising since the coagulation is accomplished in a bath at a temperature below 10° C., as the lowering of the temperature reduces the rate of diffusion of the solvent, contained in the gel, in the coagulant bath. It is the combination of the cellulose concentration in the solution, the nature of the solvent mixture, the formaldehyde/cellulose ratio, and the nature and temperature of the coagulant bath which allows the present process to achieve sufficiently rapid coagulation of the cellulose for the shaped articles obtained in the resulting gelled or coagulated state to be capable of withstanding the tension normally applied to the gel during handling of, e.g., filaments, or films.

The cellulose fibers which are obtained from the present process exhibit good mechanical properties, and especially elongation properties. The properties of the cellulose fibers produced by the present process are of the same order as those of regenerated cellulose fibers intended for textile uses. However, the process of the present invention is much more rapid and economical than the known processes for producing regenerated cellulose fibers.

The Np, or number of fibrous particles per cm³ of cellulose solution is determined by examination under a polarizing microscope. Counting is effected on the solution introduced into a rectangular microscope cell, using a magnification of 50 ×. Particles are counted if their diameter is greater than or equal to 25 microns. This test principally counts the undissolved fibers which form highly birefringent particles which are only slightly swollen, and of which the internal structure can be discerned in polarizing light, as well as certain more or less extensively swollen gels which are more or less birefringent and of which the internal structure can still be distinguished. The solutions are classified, depending upon the number of particles observed, as follows:

Np of 0 to 100 — excellent
Np of 100 to 200 — good
Np of 200 to 400 — good to satisfactory
Np greater than 400 — mediocre.

In addition to the particles counted by the Np method described above, the cellulose solutions can also contain very extensively swollen particles or gels which virtually have no detectable internal structure, have a refractive index very close to that of the surrounding medium, and are therefore quite difficult to detect by the Np test.

The extent of these gels can be accessed by measuring the clogging index value. This clogging index is termined by filtering the solution under a constant pressure of 2 bars through a filtering medium composed of three superposed assemblies, each composed of a stainless steel gauze of 34 microns mesh size and a stainless steel gauze of 0.610 mm mesh size.

The time of passage $t_1$ corresponding to the passage of a volume of 120 cm³ of solution is determined and then the volume V, which passes through the filtering medium during a time of passage which is 4 × $t_1$, is measured. Clogging index is calculated, using the following equation:

$$I_c = 100 \, V/480$$

The solutions are classified, depending upon the clogging index value, $I_c$, obtained as follows:

$I_c$ of 90 to 100 — excellent
$I_c$ of 80 to 90 — very good
$I_c$ of 60 to 80 — satisfactory
$I_c$ less than 60 — mediocre Preferably the cellulosic solutions which are used in the present process have an Np value less than 250, more preferably less than 200, and most preferably less than 100, while the solutions have a $I_c$ value greater than 70 and preferably greater than 80.

The solutions which are particularly suitable for use in the present process are described in the application filed of even date herewith in the names of Jacques Menault and Henry Rodier entitled "Spinnable Cellulose Solution and Process for Making Same," Ser. No. 815,852, the disclosure of which is hereby incorporated by reference for the teachings of such solutions therein.

EXAMPLES OF THE INVENTION

In the following examples, which are provided for illustrating the invention without limiting it in any way, the parts and percentages are by weight, unless indicated otherwise.

EXAMPLE 1

90 grams of sulphate pulp, viscose grade, having a DP of 450 and containing 5.5% of moisture, were dried to a moisture content of less than 1% and then added to 1,000 cm³ of DMSO containing 600 ppm of water and 106 grams of 96% strength paraformaldehyde, corresponding to a paraformaldehyde/cellulose weight ratio of 1.20. The temperature of the mixture, initially at ambient temperature, was raised to 130° C. in 1 hour with slow stirring, and was maintained at this temperature for 3 hours with continued stirring. The dissolution of the cellulose was complete, as observed under a polarizing microscope.

The temperature of the resulting solution was reduced to 120° C. and then a stream of dry nitrogen at 120° C. was bubbled through the solution until formaldehyde had been removed to the point that the formaldehyde/cellulose weight ratio was 0.27. DMSO was added to the solution to compensate for DMSO losses during the nitrogen bubbling step, and the solution, which was free of gels, had a viscosity of 1,100 poises at 20° C., a Np value of 80 and a $I_c$ value of 84. The solution was extruded through a spinneret containing 200 orifices each of a diameter of 0.06 mm into a coagulant bath which consisted of a mixture of water and 30% by weight of DMSO. The coagulant bath was maintained at a temperature of +2° C. During the extrusion step the cellulose solution was maintained at a temperature of 80° C. to prevent spinneret head blockage.

The extruded filaments traveled a path of 100 cm in length in the coagulant bath, and were then withdrawn by a positively controlled mechanical device on which the filaments executed several turns and were washed countercurrently by water at a temperature of +2° C.

The filaments then underwent two successive drawing operations in air, with the first stage drawing to an extent of 44% and the second stage drawing to an extent of 30%. The peripheral speed of the last pair of drawing rollers was 25 meters per minute. The filaments were then oiled before being collected on a bobbin and dried.

These filaments exhibited the following physical characteristics:

gauge: 3 dtex
tenacity, condition state: 20.8 g/tex
elongation, condition state: 13%
tenacity, wet: 12 g/tex
elongation, wet: 14%

Comparative Example A

Example 1 was repeated, except the formaldehyde/cellulose ratio reduction step, which was achieved by bubbling nitrogen through the cellulose solution, was eliminated. The cellulose solution having a formaldehyde/cellulose weight ratio of 1.20 was extruded into the same coagulant bath, under the same extrusion and coagulation conditions as in Example 1. A gel which was devoid of cohesion and impossible to extract from the bath was obtained at the spinneret outlets.

EXAMPLE 2

Cellulose was dissolved using the procedure of Example 1, but starting from 80 grams of pulp, which was introduced into 1,000 cm$^3$ of DMSO containing 94 grams of 96% strength paraformaldehyde, with the resulting paraformaldehyde/cellulose weight ratio being 1.19. A part of the formaldehyde was then removed by continuous passage of the solution through a thin film evaporator until a formaldehyde/cellulose weight ratio of 0.42 was obtained. After readjustment to compensate for DMSO losses, the viscosity of the resulting solution was 600 poises at 20° C. The solution had a Np value of 185 and an I$_c$ value of 92.

The solution was extruded at a temperature 75° C. through a spinneret containing 3,000 orifices, each of a diameter of 0.055 mm, into a coagulant bath consisting of a water/DMSO mixture which contained 40% by weight of DMSO, and was maintained at a temperature of +2° C. The coagulant bath and subsequent apparatus were the same as used in Example 1. Upon leaving the coagulant bath, the filaments were counter-currently washed with water containing 10 grams per liter of ammonia on the outlet rollers of the coagulant bath.

The filaments were then drawn to the extend of 39% in air at ambient temperature in a first drawing step and to the extent of 23% in water at 95° C. at a second drawing step. The drawn filaments were washed with cold water, oiled and dried, and collected on a bobbin.

The filaments obtained exhibited the following physical characteristics:

gauge: 3.1 dtex
tenacity, conditioned state: 19.5 g/tex
elongation, conditioned state: 13.5%
tenacity, wet: 11 g/tex
elongation, wet: 15%

Comparative Example B

Example 2 was repeated, but the coagulant bath, which contained 30% by weight of DMSO, was maintained at a temperature of 12° C. A gel which was devoid of cohesion and impossible to extract from the bath was obtained.

Comparative Example C

Example 1 was repeated, except the removal of formaldehyde was continued until the formaldehyde/cellulose weight ratio of the solution was reduced to 0.06. The solution gelled and became opaque, and could not be spun.

EXAMPLE 3

80 grams of bleached kraft papermaking pulp, having a DP of 1,050 and containing 6% of moisture, were dried to a moisture content of less than 1% and then introduced into 1,000 cm$^3$ of DMSO containing 550 ppm of water and 94 grams of 96% strength paraformaldehyde, corresponding to a formaldehyde/cellulose weight ratio of 1.20, and dissolved using the conditions of Example 1.

Part of the formaldehyde was removed by bubbling dry nitrogen at 120° C. through the mixture, which was also maintained at 120° C., to reduce the formaldehyde/cellulose weight ratio to 0.30. The resulting solution had a viscosity of 2,100 poises at 20° C., a Np value of 240 and an I$_c$ value of 76.

The solution, maintained at a temperature of 80° C., was extruded through a spinneret containing 200 orifices, each of a diameter of 0.055 mm, into an aqueous coagulant bath containing 30% by weight of DMSO, and maintained at a temperature of 2° C.

After traveling 100 cm through the coagulant bath and extraction from the bath, the filaments were washed with water at 2° C. and then drawn twice in air, the first drawing step to the extent of 42% and the second drawing step to the extent of 15%. The filaments issued from the second drawing step at a speed of 19 meters per minute, and were washed with water at 15° C., oiled and dried on a heating plate at 250° C.

The resulting filaments exhibited the following physical characteristics:

gauge: 2.6 dtex
tenacity, conditioned state: 23 g/tex
elongation, conditioned state: 15%
tenacity, wet: 14 g/tex
elongation, wet: 17%

EXAMPLE 4

The cellulose solution obtained in Example 1, having a viscosity of 1,100 poises at 20° C., and a formaldehyde/cellulose weight ratio of 0.27, was cast on a glass plate and spread by means of a doctor blade. The cellulose was precipitated by immersion into a coagulant bath for a time of 15 seconds. The coagulant bath consisted of a mixture of water and 30% by weight of DMSO, and was maintained at a temperature of 8° C.

A transparent film was obtained on the glass plate, and the film was washed with cold water to remove residual solvent, immersed in a 2% strength aqueous solution of glycerol for 15 minutes and then dried on a plate at 50° C. A transparent, limpid and colorless 0.090 mm thick cellulosic film was obtained, which had an appearance and physical characteristics which were close to those of cellophane.

EXAMPLE 5

240 g of sulphate pulp for viscose, having a DP of 450, dryed at 110° C. during 12 hours, are added to 2472 g of DMSO and 288 g of paraformaldehyde (paraformaldehyde/cellulose ratio: 1.20). The temperature of the mixture is raised to 130° C. in 1 hour, with low stirring, and then maintained at 130° C. for 3 hours.

The dissolution of the cellulose observed under a polarizing microscope is good (Np about 150). The viscosity of the solution is 1200 poises at 20° C.

Into the solution obtained, is bubbled a stream of dry nitrogen, at 120° C., to remove a part of the formaldehyde and lower the formaldehyde/cellulose ratio to 0.3%. The obtained solution has a viscosity of 1300 poises at 20° C. and a number of non-dissolved particles of about 150.

It is filtered on a nickel gauze of 50 microns mesh size under a pressure of 2 kg/cm2.

It is extruded through a hopper (lip gap: 14/0.100 mm) in a coagulating bath at 2° C. consisting of a mixture DMSO/water in the ratio of 30/70 by weight.

After a travel of 13.5 cm in this bath (contact time: 4 seconds), the mechanically driven gel is washed with water at 60° C., then in water at 2° C.

It is dryed on a plate.

A transparent, 18 microns thick film is obtained which has an appearance and characteristics close to those of Cellophane.

The loss in width and gel swelling are smaller than in the viscose process.

What is claimed is:

1. Process for producing shaped articles of cellulose, said process comprising contacting a solution of cellulose in DMSO and formaldehyde, containing at least 6% by weight of cellulose based on the volume of DMSO and containing formaldehyde in a weight ratio of formaldehyde/cellulose of 0.2 to 0.6, in said shaped form with a coagulating solution consisting essentially of DMSO and water at a temperature of no greater than 10° C.

2. Process of claim 1, wherein said shaped articles are films.

3. Process of claim 1, wherein said shaped articles are filaments.

4. Process of claim 3, wherein said cellulose has a DP of at least 400.

5. Process of claim 4, wherein the coagulant bath contains 30 to 50% by weight of DMSO.

6. Process of claim 5, wherein the formaldehyde/cellulose weight ratio is 0.2 to 0.4.

7. Process of claim 4, wherein the temperature of the coagulant bath is about +2° C.

8. Process of claim 4, including the further step of drawing said filaments.

9. Process for producing filaments of cellulose, said process comprising extruding a solution of cellulose having a DP of at least 400 in DMSO and formaldehyde, said solution containing at least 6% by weight of cellulose based on the volume of DMSO, and containing formaldehyde in a formaldehyde/cellulose weight ratio of 0.2 to 0.6, into a coagulating bath at a temperature no greater than 10° C. and consisting essentially of water and 30 to 50% by weight of DMSO, whereby filaments having properties similar to regenerated cellulose are obtained in a coagulation time of less than 20 seconds.

10. Process of claim 1, wherein said shaped articles are membranes.